(12) United States Patent
Rajbhandari et al.

(10) Patent No.: US 12,353,594 B2
(45) Date of Patent: Jul. 8, 2025

(54) SYSTEM AND METHOD FOR DATA PRIVACY COMPLIANCE

(71) Applicant: THALES DIS CPL USA, INC., Austin, TX (US)

(72) Inventors: Ilika Rajbhandari, Noida (IN); Mohd Shahab Khan, New Delhi (IN); Mukul Tope, Noida (IN)

(73) Assignee: THALES DIS CPL USA, INC., Austin, TX (US)

( * ) Notice: Subject to any disclaimer, the term of this patent is extended or adjusted under 35 U.S.C. 154(b) by 296 days.

(21) Appl. No.: 17/948,334

(22) Filed: Sep. 20, 2022

(65) Prior Publication Data

US 2024/0095396 A1    Mar. 21, 2024

(51) Int. Cl.
G06F 21/62      (2013.01)
G06F 21/60      (2013.01)
H04L 9/08       (2006.01)
H04L 9/32       (2006.01)

(52) U.S. Cl.
CPC ........ *G06F 21/6245* (2013.01); *G06F 21/602* (2013.01); *H04L 9/083* (2013.01); *H04L 9/0891* (2013.01); *H04L 9/321* (2013.01)

(58) Field of Classification Search
CPC .............. G06F 21/6245; G06F 21/602; G06F 21/6209; H04L 9/083; H04L 9/0891; H04L 9/321
See application file for complete search history.

(56) References Cited

U.S. PATENT DOCUMENTS

| | | | | | |
|---|---|---|---|---|---|
| 9,473,467 | B2* | 10/2016 | Wang | ............... | G06F 21/6272 |
| 9,900,295 | B2* | 2/2018 | Mehta | ............... | H04L 63/06 |
| 10,503,926 | B2* | 12/2019 | Barday | ............... | G06F 21/6245 |
| 10,616,194 | B2* | 4/2020 | Cignetti | ............... | H04L 63/0428 |
| 10,699,023 | B1* | 6/2020 | Mokashi | ............... | H04L 63/0485 |
| 10,839,099 | B2* | 11/2020 | Vogel | ............... | G06F 21/6245 |

(Continued)

FOREIGN PATENT DOCUMENTS

| | | |
|---|---|---|
| GB | 2562767 A | 11/2018 |
| WO | 2018201009 A1 | 11/2018 |

OTHER PUBLICATIONS

International Search Report (PCT/ISA/210) and Written Opinion (PCT/ISA/237) mailed on Jan. 3, 2024 by the European Patent Office as the International Searching Authority for corresponding International Application No. PCT/US2023/033194—[10 pages].

*Primary Examiner* — J. Brant Murphy (57) ABSTRACT

A method or system of providing data privacy compliance at a server with respect to a right to be forgotten can include one or more processors configured for receiving key information, data, and an expiration date in response to a request to create a key by a data subject to a key management service, sending a request to and receiving a key from the key management system, encrypting the data at the server with the key to provide encrypted data, storing the encrypted data in a storage, receiving a request to access the data, attempting to retrieve the key by the server, and denying access to the data in response to the request after a request from the data subject to revoke the key. In some embodiments, the key information received by the server is Hold Your Own Key and the encryption of data is Hold Your Own Encryption.

15 Claims, 4 Drawing Sheets

(56) References Cited

U.S. PATENT DOCUMENTS

| | | | |
|---|---|---|---|
| 11,151,280 B2* | 10/2021 | Saad | G06F 16/162 |
| 11,769,577 B1* | 9/2023 | Dods | G16H 20/10 |
| | | | 705/50 |
| 2018/0316495 A1* | 11/2018 | Wall | H04L 9/3073 |
| 2019/0222414 A1 | 7/2019 | Pe'Er et al. | |
| 2019/0392170 A1* | 12/2019 | Barday | G06F 16/22 |
| 2020/0074113 A1* | 3/2020 | DeRosa-Grund | |
| | | | G06Q 20/3829 |
| 2020/0259639 A1* | 8/2020 | Wall | G06F 21/606 |
| 2020/0387625 A1* | 12/2020 | Saad | G06F 21/6227 |

* cited by examiner

SYSTEM AND METHOD FOR DATA PRIVACY COMPLIANCE

CROSS-REFERENCE TO RELATED APPLICATIONS

Not applicable.

TECHNICAL FIELD

The present disclosure generally relates to data privacy compliance. More particularly, but not exclusively, the present disclosure relates to use of encryption keys for providing privacy compliance.

BACKGROUND

Traditional PKI models for securing devices and messages between ever-increasing multitudes of devices fail to be scalable and secure in terms of privacy. They also fail to provide an easy way to comply with various privacy laws and standards. There are situations where it is desirable to selectively delete or otherwise render inaccessible certain data contained in fields of stored data records. For instance, in the United States HIPPA (Health Insurance Portability and Accountability Act) regulations require that a person's health-related data be kept confidential and not disclosed except to authorized entities. In another example, to protect the privacy of individuals, the European Union established GDPR or the General Data Protection Regulation in May 2018. GDPR regulates organizations to protect personal information collected and instructs them to erase it under "Right to be forgotten" when it is no longer required or when requested by the Data owner or Data Subject. However, the organizations do not have a solution that ensures all the data collected, stored, and distributed is secure and can be removed at the owner's request or at their control.

The right to be forgotten has been defined as the right to silence on past events in life that are no longer occurring, and leads to allowing individuals to have information, videos or photographs about themselves deleted from certain internet records so that they cannot be found by search engines. Personal data must be erased immediately where the data are no longer needed for their original processing purpose, or the data subject has withdrawn consent and there is no other legal ground for processing, the data subject has objected and there are no overriding legitimate grounds for the processing, or erasure is required to fulfill a statutory obligation under the EU law. This right to be forgotten requires holders of a person's private personal data such as names, identification numbers, financial and social security information, credit card data, etc., to erase all or particular parts of such data from data records upon request of the person so that the data are inaccessible. This applies not only to production copies of the data, but also to data residing in all backup copies as well. The penalties on holders of private personal data for failure to comply may be severe.

This requirement to delete a user's personal data, and similar other requirements to make inaccessible certain types of data, poses a complex challenge to organizations which hold both primary and secondary copies of relevant data. Personal data are typically stored in particular predetermined fields of a user's record in a database. Organizations can implement with reasonable effort personal data erasure in a production database by accessing a user's record and either deleting or altering them by overwriting the private data fields with arbitrary or random data. However, it is a bigger challenge to erase or delete these fields in all other copies of the database that are stored as backups on the same or on another storage system, and on disaster recovery copies in another location. There is no easy way to access and delete or alter specific records in database secondary copies which does not require accessing all such copies. To delete these other copies of data, the database copies must be presented by the backup/data recovery system and either attached to a database host for deletion of the relevant data fields, or a special tool must be used for changing these data fields without a database host. Where the copies are at a remote site, or reside on tape with no immediate physical access and must be delivered to a facility where they can be mounted and processed, it is an even more complex and resource-intensive endeavor, especially where the remote copies are stored in a cloud. Such approaches are far too complex and challenging to be acceptable to most organizations.

When data is stored in the cloud, traditional firewalls are not able to effectively control the downloading and uploading of data. Data security depends on users' credentials. An attacker can gain access to a host by exploiting an application or operating system vulnerability, manipulating a user, leveraging stolen credentials, or taking advantage of lax security practices. Usage anomalies, such as an employee downloading, sharing, or uploading data from an app excessively or logins from multiple locations can indicate compromised credentials. In one example, alerting on new or rare authentication activity identifies compromised credentials. These usage anomalies can indicate out-of-compliance behaviors and even the presence of malware. Besides not truly having control of their own data, such instances can also leave a data subject out of controlling their right to privacy including their ability to enforce their right to be forgotten.

U.S. patent Ser. No. 11/151,280 issued on Oct. 19, 2021 to assignee EMC Corp. entitled "Simplified deletion of personal private data in cloud backup storage for GDPR compliance" discloses a public cloud that stores data in a database system for a plurality of entities as primary data and as one or more secondary backup copies of the primary data, the data being stored in predefined data fields of data records, personal private data of each entity is stored encrypted using an encryption/decryption key that is unique to each different entity. The encryption/decryption keys are stored in the cloud in a key store of a key management system. To delete the personal private data of a particular entity, as to comply with the right to be forgotten pursuant to GDPR regulations, or otherwise, the encryption/decryption key for that particular entity is deleted from the key store to render permanently inaccessible all copies of that entity's personal private data. Unfortunately, keys can be compromised in such a system and such a system lacks total control of personal data by the data owner.

A data owner may request directly from an organization to remove their data. However, it does not ensure that all the primary and secondary copies of the data have or will be removed.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

In some embodiments, a method of providing data privacy compliance at a server with respect to a right to be forgotten can include one or more processors and memory coupled to the one or more processors, where the memory includes computer instructions which when executed by the one or more processors causes the one or more processors at the server at an organization to perform certain operations. Such operations can include receiving key information, data, and an expiration date in response to a request to create a key by a data subject to a key management service, sending a request to the key management service for the key, receiving the key from the key management system in response to the request from the server to the key management service, encrypting the data at the server with the key to provide encrypted data, storing the encrypted data in a storage, receiving a request at the server to access the data, attempting to retrieve the key by the server from the key management service, and denying access to the data in response to the request to access the data after a request from the data subject to revoke the key since the server was unable to obtain the key. In some embodiments, the key information received by the server is a Hold Your Own Key. In some embodiments the encrypting of the data is a Hold Your Own Encryption.

In some embodiments, the key management service is a cloud key management service.

In some embodiments, the step of encrypting the data includes the steps at an encryption agent coupled to the server of receiving a request to encrypt the data from the server, encrypting the data at the encryption agent, sending the encrypted data as an encrypted file to a storage and receiving a file path at the encryption agent that can be shared. In some embodiments, the encryption agent shares the file path for the encrypted file with the server. In some embodiments, the method further includes receiving a request at the server to view the data by a requestor at the organization, and authenticating access by the server to allow viewing of the data by the requestor.

In some embodiments, the method further includes the step at a server of sending a link corresponding to the file path to the requestor, sending by the storage to the encryption agent a request to view a file corresponding to the data in response to a selection or click of the link by the requestor, authenticating the requestor if the request to view the file is done before the expiration date of the data.

In some embodiments, the method further includes the steps at the encryption agent of requesting the key from the key management service to decrypt the encrypted data, receiving the key from the key management service, and granting access to the requestor to the data from a decrypted file.

In some embodiments, the method further includes the steps at the server of automatically sending an error message to the requestor that the expiration date has been reached, receiving a request from the requestor to delete the data in response to the error message, and sending an instruction to delete the data to the storage.

In some embodiments, in response to a request by the data subject to the key management service to delete the key, the server fails to decrypt an encrypted file containing the data when a requester requests access to the encrypted file.

In some embodiments, a system of providing data privacy compliance at a server with respect to a right to be forgotten by a data subject includes one or more processors and memory coupled to the one or more processors, where the memory includes computer instructions which when executed by the one or more processors causes the one or more processors at the server at an organization to perform certain operation. In some embodiments, the operations include the operations to send a request to the key management service for the key, receive the key from the key management system in response to the request from the server to the key management service, encrypt the data at the server with the key to provide encrypted data, store the encrypted data in a storage, receive a request at the server to access the data, attempt to retrieve the key by the server from the key management service, and deny access to the data in response to the request to access the data upon a request from the data subject to revoke the key since the server was unable to obtain the key. In some embodiments, the key information received by the server is a Hold Your Own Key and the type of encryption performed at the server is Hold Your Own Encryption.

In some embodiments, the key management service is a cloud key management service.

In some embodiments, the step of encrypting the data includes the steps at an encryption agent coupled to the server of receiving a request to encrypt the data from the server, encrypting the data at the encryption agent, sending the encrypted data as an encrypted file to a storage and receiving a file path at the encryption agent that can be shared. In some embodiments, the encryption agent shares the file path for the encrypted file with the server and the server authenticates access to allow viewing of the data by a requestor at the organization in response to receiving the request at the server.

In some embodiments, a system of providing data privacy compliance by an organization with respect to a right to be forgotten by a data subject includes one or more processors and memory coupled to the one or more processors, where the memory includes computer instructions which when executed by the one or more processors causes the one or more processors at one or more of the server, an encryption agent, and a storage affiliated with the organization to perform certain operations. In some embodiments, the operations include operations to receive key information, data, and an expiration date in response to a request to create a key by the data subject to a key management service in communication with the encryption agent, send a request to the key management service for the key from the encryption agent, receive at the encryption agent the key from the key management system in response to the request from the encryption agent, encrypt the data at the encryption agent with the key to provide encrypted data, store the encrypted data in the storage, receive a request at the server to access the data, attempt to retrieve the key by the server from the key management service, and deny access to the data in response to the request to access the data after a request from the data subject to revoke the key. In some embodiments, the key information received by the server is a Hold Your Own Key. In some embodiments the encrypting of the data is a Hold Your Own Encryption.

In some embodiments, the encryption agent includes a cloud key manager and an encryption and decryption engine. In some embodiments, the encryption agent includes a cloud key manager in communication with a cloud key service and an encryption and decryption engine in communication with the cloud key manager and the storage. In some embodiments, the system is compliant with the GDPR.

In some embodiments, the system further includes the one or processors further configured to send an error message to the requestor in response to requesting access to the encrypted data after the data subject revokes the key.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

In general terms, some embodiments are configured to encrypt given documents/data with a user's key (applying the "Hold Your Own Key" (HYOK) concept or encryption scheme. HYOK enables the user to have control over the key. The user may delete the key when the user feels the information is no longer required by the organization, making the document/data inaccessible to the organization.

The embodiments herein ensure full authenticity and trust ability to the user and the organization. The solution also allows the user to selectively pick and make particular information indecipherable by revoking the corresponding key for such information.

By deploying this solution on enterprise level, the system can ensure that the organization is GDPR compliant for Right To Be Forgotten.

In some embodiments, the system or methods disclosed also make the organizations more responsible towards GDPR and more sensitive to a user's personal data. The embodiments can give the Data Subjects complete control to have their data deleted from the Organization. It also makes the organizations GDPR Compliant for Right To Be Forgotten, thus making them less susceptible to potential GDPR-related lawsuits.

"Hold Your Own Key" gives organizations full control over their cryptographic keys. The keys remain in the possession of the end-user at all times. With HYOK, data is encrypted before it is sent to the cloud. There is no decryption of the data until it is back on-premise. Therefore, HYOK ensures that sensitive data stays encrypted while in the cloud at all times. Meanwhile, the end-users encryption keys are never exposed.

For organizations that require a higher level security to meet the stringent requirements for data security as it relates to their industry, like banking, finance and healthcare, HYOK provides more stringent security than "Bring your own Key" (BYOK) and "Control Your Own Key" (CYOK) because (a) the end-user retains physical ownership and logical control of its managed encryption keys, thus always possessing their keys; (b) HYOK allows for the immediate revocation of access by deactivating the key's URL; (c) Data associated to a deactivated key is immediately made inaccessible or crypto shredded until if and when the key's availability is restored; and HYOK is ideal for organizations that must adhere to strict regulation and compliance policies.

Figure 1:
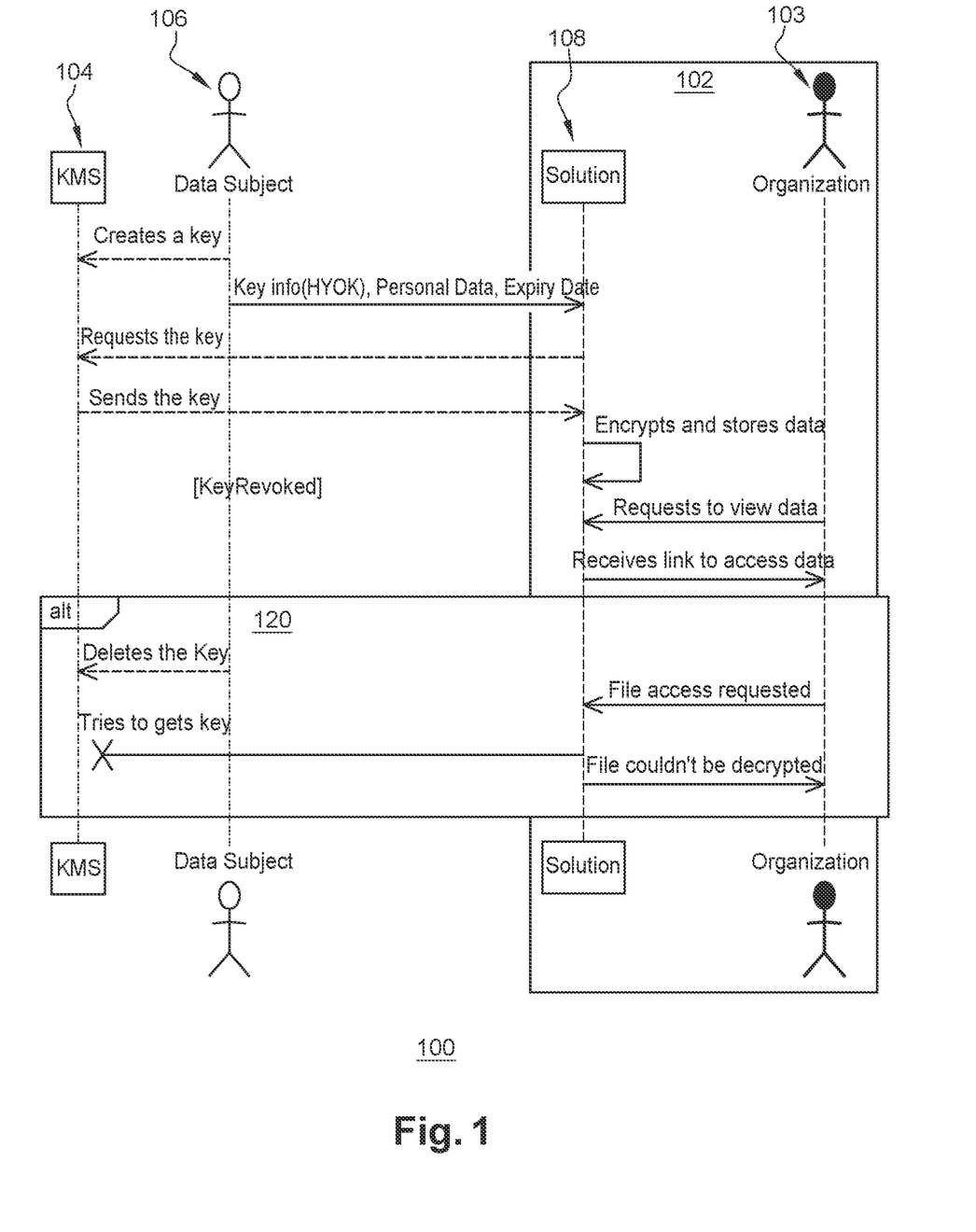
FIG. 1 illustrates a system and method of data privacy compliance in accordance with the embodiments.
Figure 2:
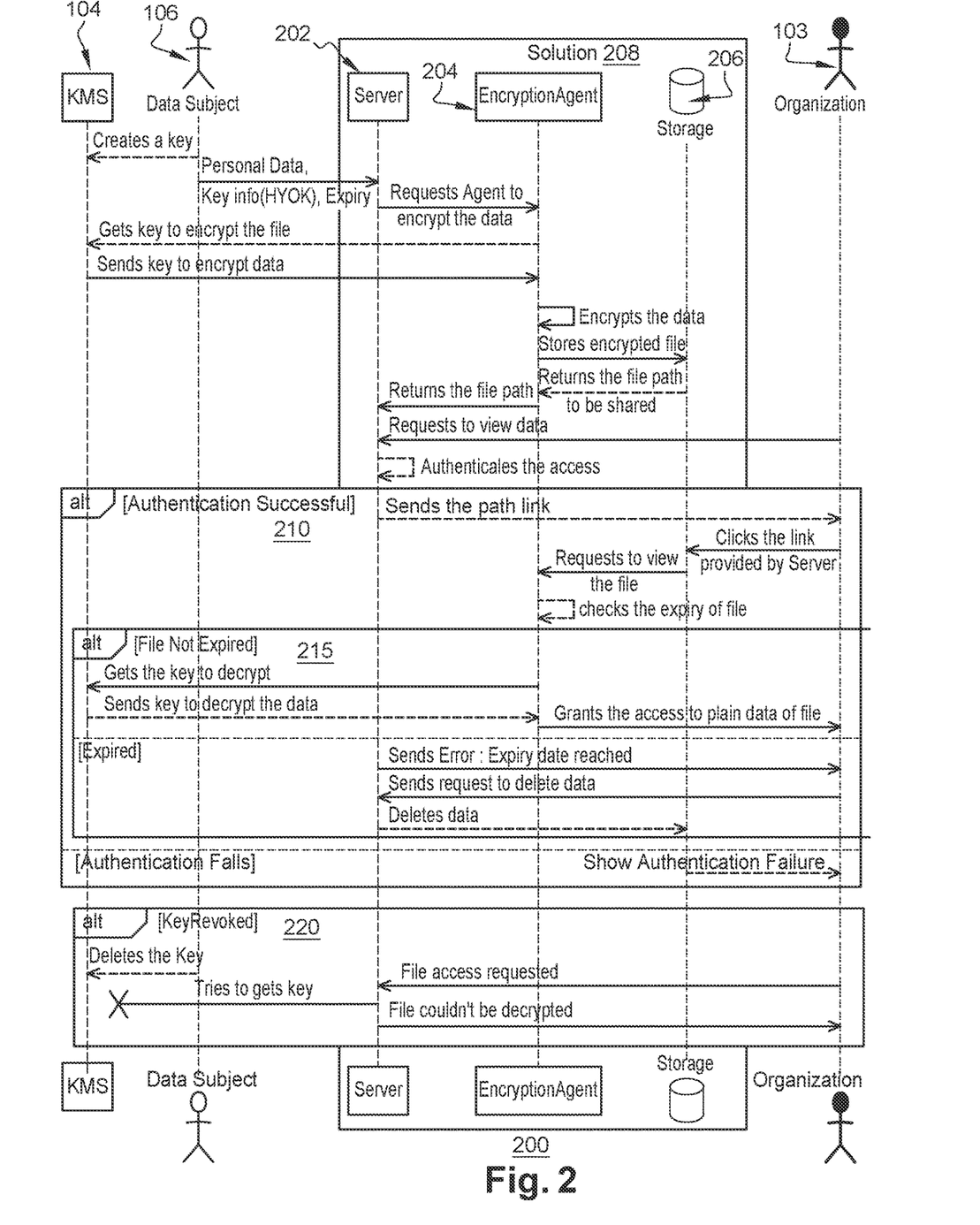
FIG. 2 illustrates another system and method of data privacy compliance in accordance with the embodiments.
Figure 3:
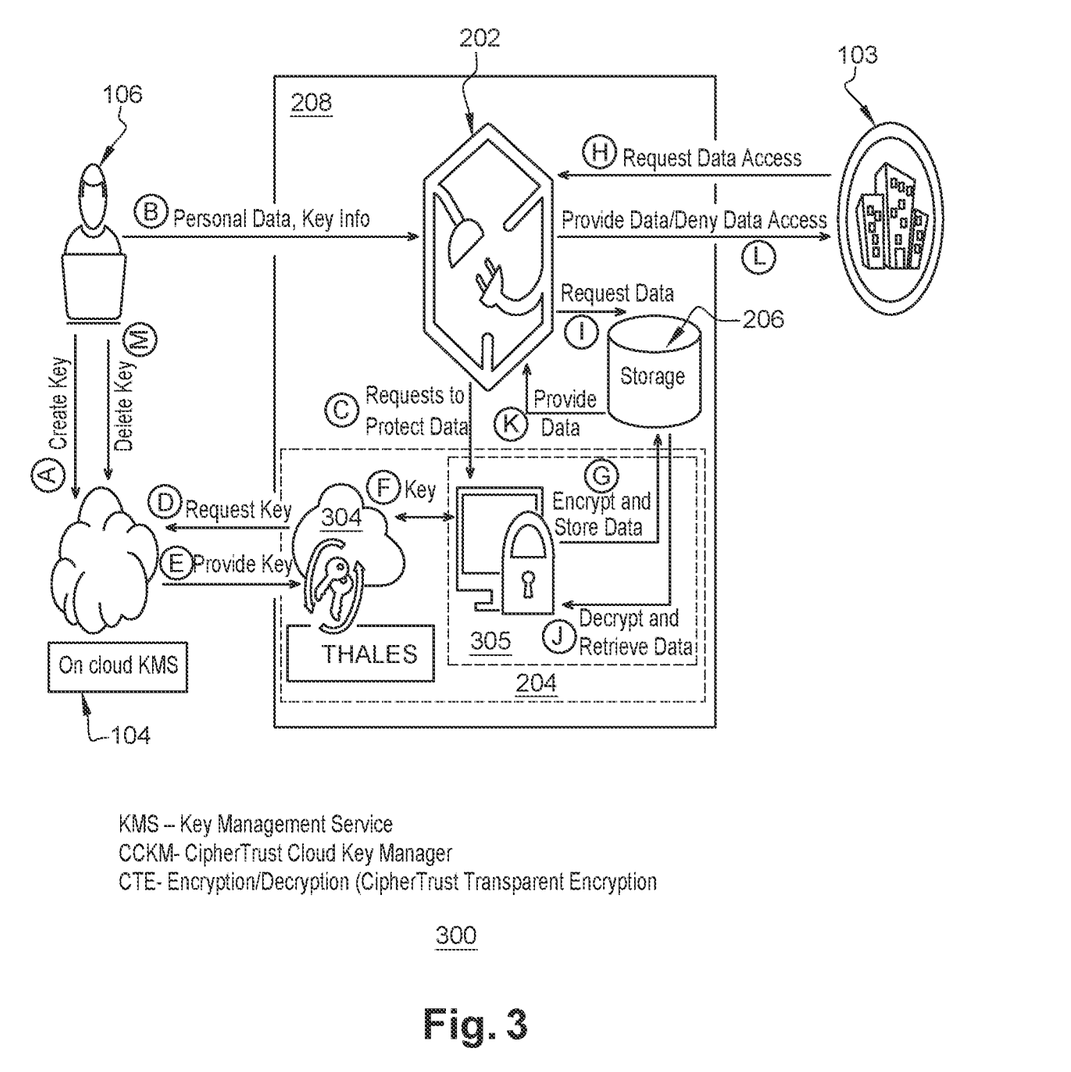
FIG. 3 illustrates a block diagram and flow for a system and method of data privacy compliance in accordance with the embodiments.

In some embodiments with reference to FIGS. 1, 2 and 3, a method and system 100, 200 or 300 of providing data privacy compliance at a server 102/202 (or an organization) with respect to a right to be forgotten can include one or more processors and memory coupled to the one or more processors, where the memory includes computer instructions which when executed by the one or more processors causes the one or more processors at the server 102/202 at an organization to perform certain operations. The organization can have individuals or requestors 103 and a solution or assembly of systems 108 that interact with a data subject 106 and a key management service 104 as well as the requestor 103. Such operations at the server 102/202 can include receiving key information, data, and an expiration date in response to a request to create a key by the data subject 106 to the key management service 104, sending a request to the key management service 104 for the key, receiving the key from the key management service 104 in response to the request from the server 102/202 to the key management service 104, encrypting the data at the server 102 with the key to provide encrypted data, storing the encrypted data in a storage 206, receiving a request at the server to access the data, attempting to retrieve the key by the server from the key management service, and denying access to the data in response to the request to access the data after a request from the data subject to revoke the key. Access is denied since the server was unable to obtain the key to decrypt the encrypted data. In some embodiments, the key information received by the server 102/202 is a Hold Your Own Key. In some embodiments the encrypting of the data is a Hold Your Own Encryption.

In some embodiments, the key management service is a cloud key management service.

In some embodiments and with reference to FIG. 2 or 3, the step of encrypting the data includes the steps at an encryption agent 204 coupled to the server 202 of receiving a request to encrypt the data from the server 202, encrypting the data at the encryption agent 204, sending the encrypted data as an encrypted file to a storage 206 and receiving a file path at the encryption agent 204 that can be shared. In some embodiments, the encryption agent 204 shares the file path for the encrypted file with the server 202. In some embodiments, the method further includes receiving a request at the server 202 to view the data by a requestor 103 at the organization, and authenticating access by the server 202 to allow viewing of the data by the requestor 103.

In some embodiments, the method further includes the step at a server 202 of sending a link corresponding to the file path to the requestor 103, sending by the storage 206 to the encryption agent 204 a request to view a file corresponding to the data in response to a selection or click of the link by the requestor 103, authenticating the requestor if the request to view the file is done before the expiration date of the data.

In some embodiments, the method further includes the steps at the encryption agent 204 of requesting the key from the key management service 104 to decrypt the encrypted data, receiving the key from the key management service 104, and granting access to the requestor 103 to the data from a decrypted file.

In some embodiments, the method further includes the steps at the server 202 of automatically sending an error message to the requestor 103 that the expiration date has been reached, receiving a request from the requestor 103 to delete the data in response to the error message, and sending an instruction to delete the data to the storage 206.

In some embodiments, in response to a request by the data subject 106 to the key management service 104 to delete the key, the server 202 fails to decrypt an encrypted file containing the data when a requester 103 requests access to the encrypted file.

In some embodiments, a system 100, 200 or 300 of providing data privacy compliance at a server 102 or 202 with respect to a right to be forgotten by a data subject 106 includes one or more processors and memory coupled to the one or more processors, where the memory includes computer instructions which when executed by the one or more processors causes the one or more processors at the server at or affiliated with an organization to perform certain operation. In some embodiments, the operations include the operations to send a request to the key management service 104 for the key, receive the key from the key management system in response to the request for the key from the server, encrypt the data at the server 102/202 with the key to provide encrypted data, store the encrypted data in a storage 206, receive a request at the server to access the data, attempt to retrieve the key by the server from the key management service 104, and deny access to the data in response to the request to access the data upon a request from the data subject 106 to revoke the key since the server was unable to obtain the key. In some embodiments, the key information received by the server is a Hold Your Own Key and the type of encryption performed at the server is Hold YourEncryption.

In some embodiments, the key management service 104 is a cloud key management service.

In some embodiments, the step of encrypting the data includes the steps at an encryption agent 204 coupled to the server 202 of receiving a request to encrypt the data from the server 202, encrypting the data at the encryption agent 204, sending the encrypted data as an encrypted file to a storage 206 and receiving a file path at the encryption agent 204 that can be shared. In some embodiments, the encryption agent 204 shares the file path for the encrypted file with the server 202 and the server 202 authenticates access to allow viewing of the data by a requestor 103 at the organization in response to receiving the request at the server 202.

In some embodiments, a system 200 or 300 of providing data privacy compliance by an organization with respect to a right to be forgotten by a data subject 106 includes one or more processors and memory coupled to the one or more processors, where the memory includes computer instructions which when executed by the one or more processors causes the one or more processors at one or more of the server 202, an encryption agent 204, and a storage 206 affiliated with the organization to perform certain operations.

In some embodiments, the operations include operations to receive key information, data, and an expiration date in response to a request to create a key by the data subject 106 to a key management service 104 in communication with the encryption agent 204, send a request to the key management service 104 for the key from the encryption agent 204, receive at the encryption agent 204 the key from the key management system 104 in response to the request from the encryption agent 204, encrypt the data at the encryption agent 204 with the key to provide encrypted data, store the encrypted data in the storage 206, receive a request at the server 202 to access the data, attempt to retrieve the key by the server 202 from the key management service 104, and deny access to the data in response to the request to access the data after a request from the data subject to revoke the key. In some embodiments, the key information received by the server is a Hold Your Own Key. In some embodiments the encrypting of the data is a Hold Your OwnEncryption.

In some embodiments with reference to FIG. 3, the encryption agent 204 includes a cloud key manager 304 and an encryption and decryption engine 305. In some embodiments, the encryption agent 204 includes a cloud key manager 304 in communication with a cloud key service 104 and an encryption and decryption engine 305 in communication with the cloud key manager 304 and the storage 206. In some embodiments, the system 100, 200, or 300 is compliant with the GDPR Right to be Forgotten regulations. In some embodiments, the cloud key manager 304 can be a CipherTrust Cloud Key Manager (CCKM) manufactured and designed by Thales. In some embodiments, the encryption and decryption engine 305 can be a CipherTrust Transparent Encryption (CTE) also manufactured and designed by Thales. Note that the encryption agent 204, Server 202, and storage 206 can be part of a solution 208 for an organization. A requestor 103 can typically be physically within the organization, but in some instances the requestor can be an authorized user affiliated or authorized by the organization to potentially access information on the servers 102/202.

In some embodiments, the system further includes the one or processors further configured to send an error message to the requestor 103 in response to requesting access to the encrypted data after the data subject 106 revokes the key.

Organizations (Data Controllers) do not have a single solution that enables them to delete all the copies of user data. It makes them vulnerable to potential lawsuits and makes it difficult for the data controllers to exercise this regulation. Users (Data Subjects) do not have any way to ensure whether all their data is deleted by the organization. The embodiments herein provide a unique solution ensuring users that their personal data is protected and empower them to exercise their right to erasure if they choose to.

Figure 4:
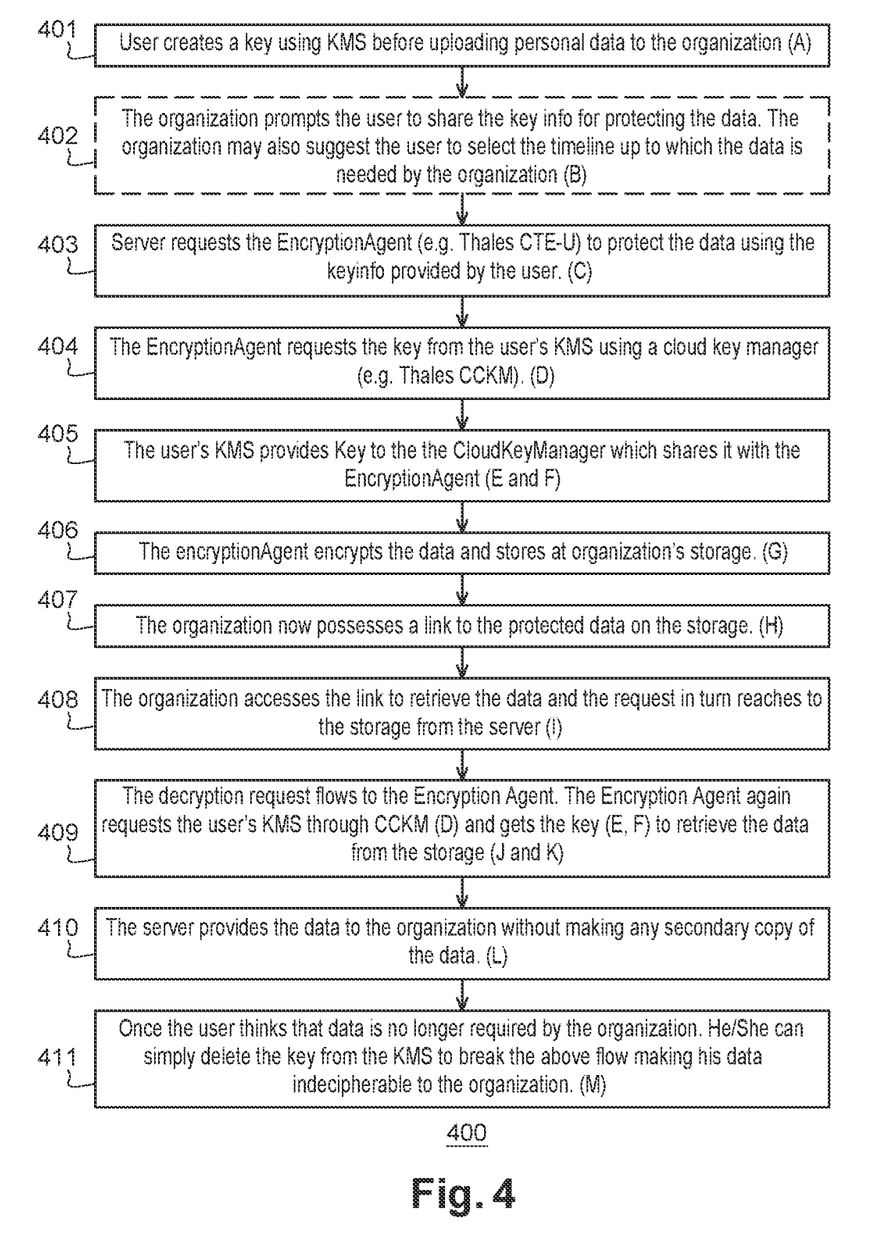
FIG. 4 illustrates a flow chart of a method of data privacy compliance in accordance with the embodiments.

Referring to FIG. 4, a flow chart demonstrates a use case of a method 400 of providing data privacy compliance. FIG. 3 also correspondingly shows letters A-M corresponding to most of the steps 401-11.

At step 401 (A), a user creates a key using KMS 104 before uploading personal data to the organization. At step 402 (B), the organization prompts the user (Data Subject 106) to share the key info for protecting the data. The organization may also suggest the user to select the timeline up to which the data is needed by the organization (the expiration date). At step 403 (C), the server 202 requests the EncryptionAgent 204 (e.g. Thales CTE and CCKM) to protect the data using the key information provided by the user/data subject 106. At step 404 (D), the encryption agent 204 requests the key from the user's KMS 104 using a cloud key manager 304 (e.g. Thales CCKM). At step 405 (E and F) the user's KMS 104 provides Key to the Cloud Key Manager 304 which shares it with the Encryption Agent 204 (or more specifically with the encryption and decryption engine 305 (Thales CTE). Then the encryption Agent 204 encrypts the data and stores at organization's storage 206 at step 406 (G).

The organization now possesses at step 407 (H) a link to the protected data on the storage 206. At step 408 (I), the organization accesses the link to retrieve the data and the request in turn reaches to the storage 206 from the server.

At step 409 (J and K) the decryption request flows to the Encryption Agent 204. The Encryption Agent 204 again requests the user's KMS 104 through the cloud key manager (CCKM) and gets the key (E, F) to retrieve the data from the storage as part of step 409 (K).

At step 410 (L), the server provides the data to the organization (or the requestor 103) without making any secondary copy of the data.

At step 411 (M), once the user (data subject 106) thinks that data is no longer required by the organization, the data subject 106 can simply delete the key from the KMS 104 to break the flow of information above and making the data subject's data indecipherable to the organization.

The solution gives control to the users (data subjects) to erase their personal data. The users can revoke the permission by erasing the key from their Key Management System, making the data indecipherable to the organization.

Giving control to the users to exercise their right to be forgotten, the organizations become compliant with the GDPR. Therefore, become stress-free from being penalized.

The solution protects the primary copy of the data through encryption and restricts from making secondary copies. It even helps the organization to keep a check on data storage and distribution.

To comply with GDPR, the organization can always share the list of the documents collected from the users. Also, the organization can erase all the data on users' requests.

The embodiments leverage the concept of HYOK. Therefore, the control of personal documents provided by the data owners will always remain with them. No prior solution ensures the right for erasure is implemented effectively at the enterprise level. An embodiment can be implemented using a number of Thales DIS products as components to solve the problems outlined herein. For example, some of the embodiments can be implemented using the THALES CCKM (CipherTrust Cloud Key Manager), CTE (Encryption/Decryption), and CM (Key Management). Thales products for Cloud Key Management (using HYOK encryption) and File Encryption can be integrated into a solution based on the concepts disclosed herein.

Organizations that wish to be GDPR compliant for the right to erasure, can deploy these products in order to pursue this solution. The solution makes the organizations more responsible towards GDPR and more sensitive towards user's personal data.

In the absence of any specific clarification related to its express use in a particular context, where the terms "substantial" or "about" or "usually" in any grammatical form are used as modifiers in the present disclosure and any appended claims (e.g., to modify a structure, a dimension, a measurement, or some other characteristic), it is understood that the characteristic may vary by up to 30 percent.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or idea.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As the context may require in this disclosure, except as the context may dictate otherwise, the singular shall mean the plural and vice versa. All pronouns shall mean and include the person, entity, firm or corporation to which they relate. Also, the masculine shall mean the feminine and vice versa.

When so arranged as described herein, each computing device or processor may be transformed from a generic and unspecific computing device or processor to a combination device comprising hardware and software configured for a specific and particular purpose providing more than conventional functions and solving a particular technical problem with a particular technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments. The various embodiments described above can be combined to provide further embodiments. Aspects of the embodiments can be modified, if necessary to employ concepts of the various patents, application and publications to provide further embodiments.

The invention claimed is:

1. A method of providing data privacy compliance at a server with respect to a right to be forgotten, comprising:
one or more processors and memory coupled to the one or more processors, wherein the memory includes computer instructions which when executed by the one or more processors causes the one or more processors at the server at an organization to perform the operations of:
receiving key information, data, and an expiration date in response to a request to create a key by a data subject to a key management service;
sending a request to the key management service for the key;
receiving the key from the key management service in response to the request from the server to the key management service;
encrypting the data at the server with the key to provide encrypted data;
storing the encrypted data in a storage;
receiving a request at the server to access the data;
attempting to retrieve the key by the server from the key management service; and
denying access to the data in response to the request to access the data after a data subject revokes the key.

2. The method of claim 1, wherein the key information received by the server is a Hold Your Own Key.

3. The method of claim 1, wherein the key management service is a cloud key management service.

4. The method of claim 1, wherein the step of encrypting the data comprises the steps at an encryption agent coupled to the server of receiving a request to encrypt the data from the server, encrypting the data at the encryption agent, sending the encrypted data as an encrypted file to a storage and receiving a file path at the encryption agent that can be shared.

5. The method of claim 4, wherein the encryption agent shares the file path for the encrypted file with the server.

6. The method of claim 5, wherein the method further comprises receiving a request at the server to view the data by a requestor at the organization, and authenticating access by the server to allow viewing of the data by the requestor.

7. The method of claim 6, wherein the method further comprises the step at a server of sending a link corresponding to the file path to the requestor, sending by the storage to the encryption agent a request to view a file corresponding to the data in response to a selection or click of the link by the requestor, authenticating the requestor if the request to view the file is done before the expiration date of the data.

8. The method of claim 7, wherein the method further comprises the steps at the server of automatically sending an error message to the requestor that the expiration date has been reached, receiving a request from the requestor to delete the data in response to the error message, and sending an instruction to delete the data to the storage.

9. The method of claim 6, wherein the method further comprises the steps at the encryption agent of requesting the key from the key management service to decrypt the encrypted data, receiving the key from the key management service, and granting access to the requestor to the data from a decrypted file.

10. The method of claim 5, wherein in response to a request by the data subject to the key management service to delete the key, the server fails to decrypt an encrypted file containing the data when a requester requests access to the encrypted file.

11. A system of providing data privacy compliance at a server with respect to a right to be forgotten by a data subject, comprising:
one or more processors and memory coupled to the one or more processors, wherein the memory includes computer instructions which when executed by the one or more processors causes the one or more processors at the server at an organization to perform the operations of:
receive key information, data, and an expiration date in response to a request to create a key by the data subject to a key management service;
send a request to the key management service for the key;
receive the key from the key management service in response to the request from the server to the key management service;
encrypt the data at the server with the key to provide encrypted data;
store the encrypted data in a storage;
receive a request at the server to access the data;
attempt to retrieve the key by the server from the key management service; and
deny access to the data in response to the request to access the data after the data subject revokes the key since the server was unable to obtain the key.

12. The system of claim 11, wherein the key information received by the server is a Hold Your Own Key and the type of encryption performed at the server is Hold Your Own Encryption.

13. The system of claim 11, wherein the key management service is a cloud key management service.

14. The system of claim 11, wherein the step of encrypting the data comprises the steps at an encryption agent coupled to the server of receiving a request to encrypt the data from the server, encrypting the data at the encryption agent, sending the encrypted data as an encrypted file to a storage and receiving a file path at the encryption agent that can be shared.

15. The system of claim 14, wherein the encryption agent shares the file path for the encrypted file with the server and the server authenticates access to allow viewing of the data by a requestor at the organization in response to receiving the request at the server.

* * * * *